United States Patent
Dymetman

(10) Patent No.: US 9,400,783 B2
(45) Date of Patent: Jul. 26, 2016

(54) PROCEDURE FOR BUILDING A MAX-ARPA TABLE IN ORDER TO COMPUTE OPTIMISTIC BACK-OFFS IN A LANGUAGE MODEL

(71) Applicant: Xerox Corporation, Norwalk, CT (US)

(72) Inventor: Marc Dymetman, Grenoble (FR)

(73) Assignee: XEROX CORPORATION, Norwalk, CT (US)

(*) Notice: Subject to any disclaimer, the term of this patent is extended or adjusted under 35 U.S.C. 154(b) by 261 days.

(21) Appl. No.: 14/089,935

(22) Filed: Nov. 26, 2013

(65) Prior Publication Data
US 2015/0149151 A1    May 28, 2015

(51) Int. Cl.
*G06F 17/27* (2006.01)
*G06F 17/28* (2006.01)

(52) U.S. Cl.
CPC ............ *G06F 17/28* (2013.01); *G06F 17/27* (2013.01)

(58) Field of Classification Search
CPC ............ G10L 15/197; G06F 15/17375; G06F 17/2715; G06F 17/18; G06F 17/27; G06F 17/277; G06F 17/2881
USPC ............ 704/9, 4, 243, 240, 2; 710/106; 709/250, 235, 232; 707/765; 455/456.1; 375/227; 370/252
See application file for complete search history.

(56) References Cited

U.S. PATENT DOCUMENTS

| | | | | |
|---|---|---|---|---|
| 5,020,020 A * | 5/1991 | Pomfret | ............... | H04L 12/44 370/408 |
| 5,187,780 A * | 2/1993 | Clark | ............... | G06F 15/17375 370/394 |
| 5,193,149 A * | 3/1993 | Awiszio | ............ | G06F 15/17375 709/250 |
| 7,031,908 B1 * | 4/2006 | Huang | ............ | G10L 15/1815 704/9 |
| 7,418,515 B2 * | 8/2008 | Harada | ............... | H04L 12/5602 709/232 |

(Continued)

FOREIGN PATENT DOCUMENTS

EP       1580667 A2 *   9/2005    ............ G06F 17/277

OTHER PUBLICATIONS

Aziz, et al. "Investigations in Exact Inference for Hierarchical Translation" Proc. of the Eighth Workshop on Statistical Machine Translation, Aug. 8-9, 2013, pp. 472-483.

(Continued)

*Primary Examiner* — Michael Colucci
(74) *Attorney, Agent, or Firm* — Fay Sharpe LLP

(57) ABSTRACT

Each entry of an ARPA table for a modeled language includes an n-gram Az, an associated backoff value Az.p equal to the conditional probability $p(z|A)$ that symbol z follows context A in the modeled language, and an associated backoff weight value Az.b for the context A. A method comprises: (1) computing and adding for each entry of the ARPA table in descending n-gram order an associated maximum backoff weight product value Az.m; (2) after performing operation (1), computing and adding for each entry of the ARPA table in descending n-gram order an associated max-backoff value $Az.w=\max_h p(z|hA)$ which is the maximum backoff value for any head h preceding the context A of the n-gram Az; and (3) extending the ARPA table by adding a column storing the associated maximum backoff weight product values Az.m and a column storing the associated max-backoff values Az.w.

20 Claims, 1 Drawing Sheet

(56) References Cited

U.S. PATENT DOCUMENTS

| | | | | |
|---|---|---|---|---|
| 8,031,602 | B2* | 10/2011 | Jiang | H04L 43/0817 370/232 |
| 8,285,536 | B1* | 10/2012 | Kumar | G06F 17/2809 704/2 |
| 8,655,647 | B2* | 2/2014 | Moore | G06F 17/271 704/1 |
| 2005/0055199 | A1* | 3/2005 | Ryzchachkin | G10L 15/197 704/4 |
| 2005/0216265 | A1* | 9/2005 | Chelba | G06F 17/277 704/240 |
| 2005/0228641 | A1* | 10/2005 | Chelba | G06F 17/27 704/9 |
| 2006/0031069 | A1* | 2/2006 | Huang | G10L 13/08 704/243 |
| 2006/0285585 | A1* | 12/2006 | Sampath | H04B 7/063 375/227 |
| 2010/0241647 | A1* | 9/2010 | Ntoulas | G06F 17/30528 707/765 |
| 2011/0224983 | A1* | 9/2011 | Moore | G06F 17/2715 704/240 |
| 2012/0259807 | A1 | 10/2012 | Dymetman | |
| 2013/0096877 | A1 | 4/2013 | Dymetman et al. | |
| 2013/0338999 | A1* | 12/2013 | Dymetman | G06F 17/18 704/9 |
| 2014/0112175 | A1* | 4/2014 | Pantelidou | H04W 28/26 370/252 |
| 2015/0215793 | A1* | 7/2015 | Siomina | G01S 5/0205 455/456.1 |

OTHER PUBLICATIONS

Carter, et al. "Exact sampling and decoding in high-order hidden Markov models" Proc. of the 2012 Joint Conf. on Empirical Methods in Natural Language Processing and Computational Natural Language Learning, Jul. 12-14, 2012, pp. 1125-1134.

Chen, et al. "An empirical study on smoothing techniques for Language Modeling" *Proc of the 34th annual meeting on Association for Computational Linguistics*, 2006, pp. 310-318.

Chen et al. "An Empirical Study of Smoothing Techniques for Language Modeling" Harvard University, Aug. 1998, pp. 1-64.

Dymetman, et al. "Optimization for Sampling for NLP from a unified viewpoint" Proc. of the First Intl. Workshop on Optimization Techniques for Human Technology, Dec. 2012, pp. 79-94.

Dymetman, et al. "The OS algorithm: a Joint approach to Exact Optimization and Sampling" *arXiv preprint arXiv:1207.0742*, Jul. 3, 2012, pp. 1-21.

Jurafsky, et al. "4.8 Practical Issues: Toolkits and Data formats" Speech and Language Processing, 2000, vol. 2, pp. 1-3.

Yuret, et al. "ngram-discount" SRI International, 2007, pp. 1-8.

\* cited by examiner

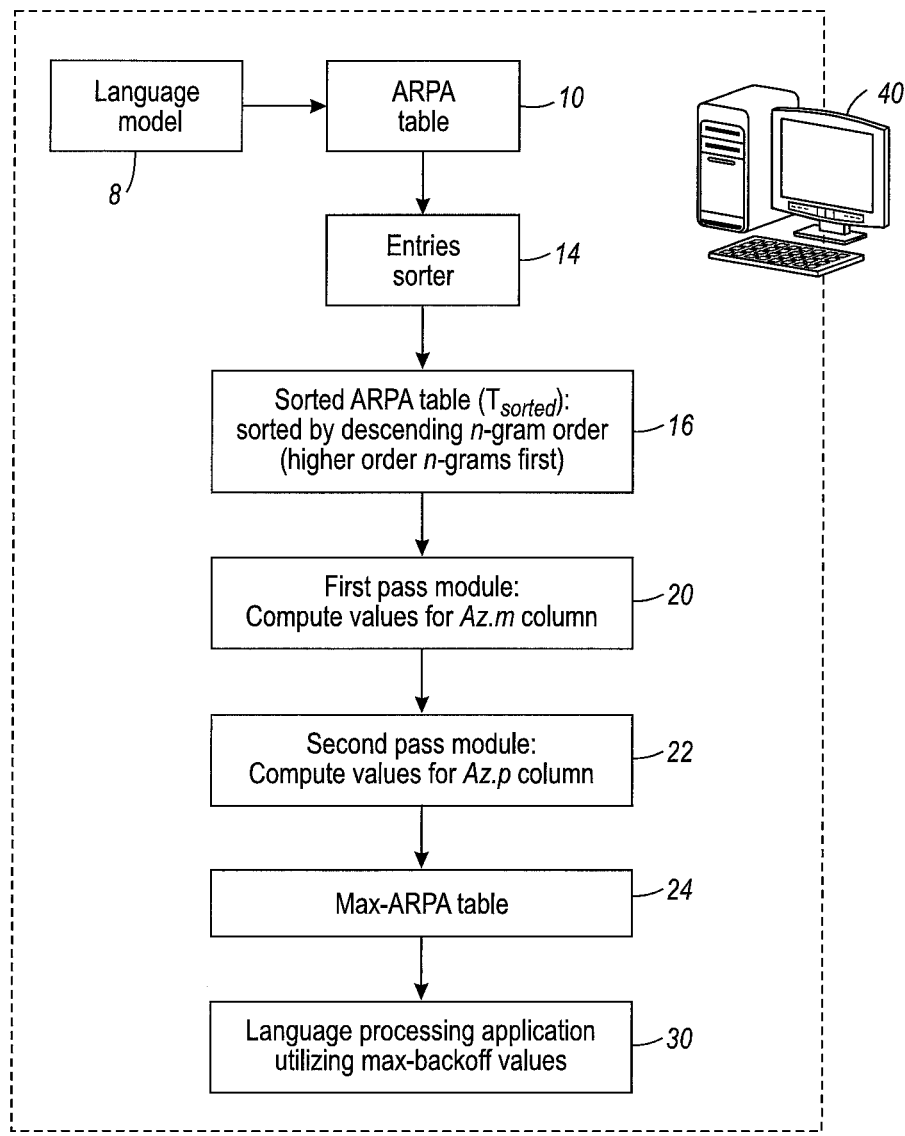

PROCEDURE FOR BUILDING A MAX-ARPA TABLE IN ORDER TO COMPUTE OPTIMISTIC BACK-OFFS IN A LANGUAGE MODEL

BACKGROUND

The following relates to the language modeling arts, language processing arts, and related arts.

A typical language model of order N operates on text strings of maximum length N words (or N characters in a language such as Chinese, or more generally N symbols where "symbol" encompasses a word, or a character, or equivalent of the modeled language). For example, a bigram language model has N=2, a trigram language model has N=3, and so forth. In such language models, a useful operation is to compute the probability $p(A,z)=p(z|A)$ where $(A,z)$ denotes a symbol string A followed by a single symbol z. The notation Az is sometimes used herein as shorthand for $(A,z)$. By way of illustrative example, if A=(The two) and z=(cats) then $(A,z)=Az=$"The two cats". Intuitively, the probability $p(A,z)=p(z|A)$ thus gives the probability of the symbol z following the string A in text of the modeled language. The string A of Az is sometimes referred to as the context of z.

A standard way of representing certain types of smoothed language models is through a so-called "ARPA" table. Such a table provides a compact "backoff" representation suitable for looking up probabilities of the form $p(A,z)$ predicted by the language model. For a language model of order N, the ARPA table contains n-grams of order 1 to N, with higher-order n-grams being more sparsely recorded than lower-order n-grams. An ARPA table can be constructed to have the following property: If the ARPA table contains an n-gram of order n, then the ARPA table also contains all substrings of this n-gram of order 1 to n−1. Each n-gram Az is a line entry in the ARPA table, and each such line entry Az has two associated columns containing non-negative numbers Az.p and Az.b. The number Az.p is always less than one and corresponds to the conditional probability $p(A,z)=p(z|A)$ assigned by the language model to the word z in the context A. The number Az.b is referred to as the back-off weight (bow) for the context A, and is used in computing conditional probabilities associated with n-grams that are not listed in the ARPA table.

For some applications, it is also useful to compute so-called "max-backoff" values. For an n-gram Az, the max-backoff is defined as the highest probability $p(hAz)=p(z|hA)$ for any "head" or "prefix" h, where h denotes any possible string (including the possibility of the empty string $\in$) that could precede A. Formally, max-backoff $w(A,z)=\max_h p(z|hA)$.

It has been proposed (Carter et al., "Exact Sampling and Decoding in High-Order Hidden Markov Models", in *Proceedings of the* 2012 *Joint Conference on Empirical Methods in Natural Language Processing and Computational Natural Language Learning*, pages 1125-34, Jeju Island, Korea (July 2012)) to determine the max-backoff $w(A,z)$ in an application using an extended ARPA table, referred to herein as a Max-ARPA table, in which two additional columns are added: (1) a column for the max log probability, which is equal to the maximum log probability over all the n-grams extending the context A, and (2) a column for a "max backoff" weight which is a number used for computing the max log probability of an n-gram not listed in the Max-ARPA table. With the values in these columns, the max-backoff can be recursively computed for Az values that are not listed in the Max-ARPA table.

BRIEF DESCRIPTION

In some illustrative embodiments disclosed as illustrative examples herein, a non-transitory storage medium stores instructions readable and executable by an electronic data processing device to perform a method operating on an ARPA table for a modeled language in which each entry of the ARPA table includes an n-gram Az, an associated backoff value Az.p equal to the conditional probability $p(z|A)$ that symbol z follows context A in the modeled language, and an associated backoff weight value Az.b for the context A. The method comprises computing a max-ARPA table from the ARPA table by operations including: computing and adding for each entry of the ARPA table an associated maximum backoff weight product value Az.m wherein the computing and adding of the associated maximum backoff weight product values is performed on the entries of the ARPA table in descending n-gram order; and after computing and adding the associated maximum backoff weight product values, computing and adding for each entry of the ARPA table an associated max-backoff value Az.w=w(A,z) where $w(A,z)=\max_h p(z|hA)$ is the maximum backoff value for any head h preceding the context A of the n-gram Az and the computing and adding of the associated max-backoff values is performed on the entries of the ARPA table in descending n-gram order. Each entry of the max-ARPA table includes an n-gram Az and its associated backoff value Az.p, backoff weight value Az.b, maximum backoff weight product value Az.m, and max-backoff value Az.w.

In some illustrative embodiments disclosed as illustrative examples herein, a method operates on an ARPA table for a modeled language in which each entry of the ARPA table includes an n-gram Az, an associated backoff value Az.p equal to the conditional probability $p(z|A)$ that symbol z follows context A in the modeled language, and an associated backoff weight value Az.b for the context A. The method comprises computing a max-ARPA table from the ARPA table by using an electronic data processing device to perform the operations of: sorting the entries of the ARPA table in descending n-gram order to generate a sorted ARPA table; (1) after the sorting, computing and adding for each entry from top-to-bottom of the sorted ARPA table an associated maximum backoff weight product value Az.m; and (2) after performing operation (1), computing and adding for each entry from top-to-bottom of the sorted ARPA table an associated max-backoff value Az.w where $Az.w=\max_h p(z|hA)$ is the maximum backoff value for any head h preceding the context A of the n-gram Az. Each entry of the max-ARPA table includes an n-gram Az and its associated backoff value Az.p, backoff weight value Az.b, maximum backoff weight product value Az.m, and max-backoff value Az.w.

In some illustrative embodiments disclosed as illustrative examples herein, an apparatus comprises an electronic data processing device programmed to perform a method operating on an ARPA table for a modeled language in which each entry of the ARPA table includes an n-gram Az, an associated backoff value Az.p equal to the conditional probability $p(z|A)$ that symbol z follows context A in the modeled language, and an associated backoff weight value Az.b for the context A. The method comprises: (1) computing and adding for each entry of the ARPA table in descending n-gram order an associated maximum backoff weight product value Az.m; (2) after performing operation (1), computing and adding for each entry of the ARPA table in descending n-gram order an associated max-backoff value $Az.w = \max_h p(z|hA)$ which is the maximum backoff value for any head h preceding the context A of the n-gram Az; and (3) extending the ARPA table by adding a column storing the associated maximum backoff weight product values Az.m and a column storing the associated max-backoff values Az.w.

BRIEF DESCRIPTION OF THE DRAWINGS

The FIGURE diagrammatically shows a language processing system employing max-backoff values determined using a Max-ARPA table, including components for generating the Max-ARPA table.

DETAILED DESCRIPTION

With reference to the FIGURE, a language processing system is described, which makes use of a language model 8. In some embodiments, the modeled language is a written natural language, e.g. written English, written French, written Chinese, written Hindi, or so forth, and language content is expressed as strings of symbols (e.g. words or characters) forming sentences or other constructs in accord with a natural language grammar. Such language models are used in applications such as parsing, statistical machine translation (SMT), or so forth. In other embodiments, the modeled language may be other than a written natural language. For example, the modeled language may be a spoken language in which the symbols are audio segments corresponding to spoken words. Such a language model is useful for speech recognition and transcription applications, for example. These are merely illustrative examples.

In illustrative embodiments presented herein, the language model 8 is a natural language model, for example suitably represented as a smoothed n-gram language model. For an unsmoothed n-gram language model, the conditional probability $P(z|A)$ of a symbol z following context $A = w_1 w_2 \ldots w_{n-1}$ is given by:

$$P(z|A) = \frac{\text{count}(Az)}{\text{count}(A)} \quad (1)$$

where n is the order of the n-gram, the string Az is of length n, and count(Az) and count(A) are the number of occurences of the sequence Az and of the sequence A in a training corpus, respectively. In practice, a smoothed n-gram language model is preferable. See, e.g. Chen et al., "An empirical study of smoothing techniques for language modelling", *Computer Speech & Language*, vol. 13, pages 359-393 (1999); Chen et al., "An Empirical Study of Smoothing Techniques for Language Modeling", Center for Research in Computing Technology (TR-10-98), Harvard University (1998). More generally, the language model 8 may be any language model that outputs conditional probability $P(z|A)$ of a symbol z following context A for content in the modeled language.

The language model 8 is represented as an ARPA table 10 by computing entries of the form (Az,Az.p,Az.b) for a representative set of n-grams [Az]. See, e.g. Daniel Jurafsky and James H. Martin, SPEECH AND LANGUAGE PROCESSING, $2^{nd}$ edition (Pearson Prentice Hall 2008), chapter 4. The values $Az.p = p(z|A)$ are suitably computed directly from the language model 8. For a language model of order N, the ARPA table 10 contains n-grams of order 1 to N, with higher-order n-grams being more sparsely recorded in the ARPA table 10 than lower-order n-grams. The ARPA table 10 is constructed to have the property that if it contains an n-gram of order n, it also contains all the substrings of this n-gram.

In sum, with each n-gram Az (line entry) in the ARPA table 10 are associated two columns containing non-negative numbers Az.p and Az.b. The number Az.p is always smaller than 1 and corresponds to the conditional probability $p(A,z) = p(z|A)$ assigned by the language model 8 to the word z in the context A (or, alternatively, determined from statistics of a corpus of the modeled language). The number Az.b is the backoff weight (bow) value, and is used for computing conditional probabilities associated with n-grams that are not listed in the ARPA table 10. The computation of $p(A,z)$ for Az is suitably given by:

$$p(A, z) = \begin{cases} p(\text{tail}(A), z) & \text{if } Az \notin T \text{ and } A \notin T \\ p(\text{tail}(A), z) \times A \cdot b & \text{if } Az \notin T \text{ and } A \in T \\ Az \cdot p & \text{if } Az \in T \end{cases} \quad (2)$$

where T denotes the ARPA table 10 and tail(A) denotes the string A with its first element removed. For example, if A=(the two cats) then tail(A)=(two cats). The last line on the right-hand side of Equation (2) states that if Az is in the ARPA table 10 (that is, if $Az \in T$) then $p(A,z) = Az.p$ is read directly from the ARPA table 10. On the other hand, if Az is not in the ARPA table 10, then the computation of $p(A,z)$ for Az is done recursively using the first two lines on the righthand side of Equation (2), where the middle line is applied if the backoff weight A.b is in the ARPA table and the topmost line is applied otherwise (using a default value A.b=1). The first two lines on the right side of Equation (2) can only be applied for $A \neq \epsilon$ (where $\epsilon$ is the empty string). In applying Equation (2) it is assumed that all words z in the vocabulary V have at least an entry in the table of the form $\epsilon z$. Computation of $p(A,z)$ using Equation (2) may involve a few recursive calls, but never more than the length of the context A. The term $A \in T$ means that there is some table entry Az' with $z' \neq z$ (otherwise the last line on the righthand side is applied to compute $p(A,z) = Az.p$ directly), and then A.b is equal to the table entry Az'.b, i.e. A.b=Az'.b. In other words, the backoff weight is for the context A and does not depend on z, and the backoff weight Az'.b can be written more succinctly as A.b.

Generation of the Max-ARPA table from the ARPA table 10 is now described. The Max-ARPA table has the same n-gram line entries as the ARPA table T, and has the columns Az.p and Az.b of the ARPA table 10, but is extended by adding two further columns Az.w and Az.m. The non-negative number Az.w is always smaller than 1 and directly gives the max-backoff weight $w(A,z) \, E \, \max_h p(z|hA)$ for the entry Az listed in the ARPA table T. Again, h denotes the "head" or "prefix" preceding the context A in the string hAz, and max-backoff weight $w(A,z) \max_h p(z|hA)$ intuitively corresponds to the largest backoff for any possible head h. The non-negative number Az.m is a maximum backoff weight product value (also referred to herein as "maximum bow product value"). The value Az.m is used to compute the value of the max-backoff w for n-grams that are not listed in the ARPA table T.

With continuing reference to the FIGURE, in order to compute the two additional columns of the table so as to extend the ARPA table 10 to a Max-ARPA table, the following operations are performed. An ARPA table entries sorter 14 sorts the n-gram entries of the ARPA table 10 by descending order of length, with higher-order n-grams listed first, to generate a sorted ARPA table 16, which is denoted herein as $T_{sorted}$. In other words, after sorting by the entries sorter 14 the sorted ARPA table 16 has all n-gram entries with the largest value of n listed first, and all n-gram entries with the smallest value of n (namely n-grams of the form ϵz where ϵ is the empty string, for which n=1) listed last. In the sorted ARPA table $T_{sorted}$, all entries having the same value of n are listed together and form a block of entries of order n—the ordering of entries within each block of entries of same value n is not material. Accordingly, operation of the entries sorter 14 is efficient, as it applies a string-length function to each entry of the ARPA table 10 and groups the integer outputs from largest value to smallest.

The sorted APRA table $T_{sorted}$ 16 is then processed by a two-pass process in which a first-pass module 20 computes the Az.m values (i.e. maximum bow products) and then a second-pass module 22 computes the Az.w values (max-backoff values). The first-pass module 20 suitably applies the following algorithm:

| 1 | For A in $T_{sorted}$ | |
| 2 | A.m ← 1 | |
| 3 | For x in V s.t.xA in $T_{sorted}$: | (Pass1 Algorithm) |
| 4 | A.m ← max(A.m,xA.b × xA.m) | |

In the Pass1 Algorithm, the symbol A is used in a slightly different manner than elsewhere herein. Specifically, A denotes the entire entry string, rather than as the context portion of a string A.z as it is used elsewhere herein. The Pass1 Algorithm is applied to the sorted ARPA table $T_{sorted}$ in a top-to-bottom manner, so that the highest-order n-grams are processed first.

The second pass module 22 operates after the first pass is complete, and makes use of the .m values computed in the first pass:

| 1 | For Az in $T_{sorted}$ | |
| 2 | Az.w ← Az.p | |
| 3 | For x in V s.t.xA in $T_{sorted}$: | |
| 4 | If xAz in $T_{sorted}$: | (Pass2 Algorithm) |
| 5 | Az.w ← max(Az.w,xAz.w) | |
| 6 | Else | |
| 7 | Az.w ← max(Az.w,Az.p × xA.b × xA.m) | |

In the Pass2 Algorithm, the entries in the table are named in a different way than in the Pass1 Algorithm. For example, in Pass 1, if the first entry in the table is the 3-gram the two cats, then for this entry A=the two cats, that is, A as used in Pass1 is the entire entry. On the other hand, the Pass2 Algorithm uses the notation A.z=the two cats for this entry, where z=cats in the context A=the two. The entry for the two is then found lower in the table as compared with the two cats, and typically, (the two cats).m will have a different value from the (the two).m. The Pass2 Algorithm is again applied in a top-to-bottom manner, so that the highest-order n-grams are processed first and the ϵz n-grams of order n=1 are processed last. In an alternative embodiment, the sorting performed by the sorter 14 is omitted, and the Pass1 and Pass2 Algorithms are modified to perform a search of the original ARPA table 10 to locate and process the longest n-grams, followed by the next-longest, and so forth, until the ϵz n-grams of order n=1 are processed last).

The output of the Pass2 Algorithm performed by the second-pass module 22 is the max-ARPA table 24, denoted herein as $T_{mA}$, which may be used by any language processing application 30 that utilizes max-backoff values. The application 30 may, for example, be (or include) a natural language parser, a statistical machine translation (SMT) system or subsystem, or so forth. In some illustrative embodiments, the application 30 may include sampling of natural language content utilizing max-backoff factors as described in Carter et al., "Exact Sampling and Decoding in High-Order Hidden Markov Models", in *Proceedings of the* 2012 *Joint Conference on Empirical Methods in Natural Language Processing and Computational Natural Language Learning*, pages 1125-34, Jeju Island, Korea (July 2012). In this application, a language model represented by an ARPA table is sampled by generating an upper bound on the language model and then sequentially refining the upper bound during the sampling process to improve the approximation of the true language model provided by the upper bound. In this sampling approach, max-backoff values are utilized to compute the upper bound. The sampling can be used for application such as statistical machine translation and part-of-speech tagging. See Carter et al., supra; Aziz et al., "Investigations in Exact Inference for Hierarchical Translation", in *Proceedings Of the Eighth Workshop on Statistical Machine Translation*, pages 472-83 (Sofia, Bulgaria, Aug. 8-9, 2013). These are merely illustrative examples. In such applications, the max-ARPA table 24 enables computation of the max-backoff w(A, z) for an n-gram Az as follows:

$$w(A,z) = \begin{cases} p(A,z) & \text{if } Az \notin T_{mA} \text{ and } A \notin T_{mA} \\ p(A,z) \times A \cdot m & \text{if } Az \notin T_{mA} \text{ and } A \in T_{mA} \\ Az \cdot w & \text{if } Az \in T_{mA} \end{cases} \quad (3)$$

where p(A,z) is computed from the Az.p and Az.b columns of the max-ARPA table 24 using Equation (2). (The Az.p and Az.b columns of the max-ARPA table 24 are the same as the Az.p and Az.b columns of the original ARPA table 10, except for the reordering of entries performed by the entries sorter 14). The last line on the righthand side of Equation (3) states that if Az is in the max-ARPA table 24 (that is, if $Az \in T_{mA}$) then w(A,z)=Az.w is read directly from the max-ARPA table 24. On the other hand, if Az is not in the max-ARPA table 24, then the computation of p(A,z) for Az is done recursively using the first two lines on the righthand side of Equation (3), where the middle line is applied if the maximum backoff weight product value Az.m is in the max-ARPA table and the topmost line is applied otherwise (using a default value A.m=1; other default values for A.m are also contemplated).

The illustrative language processing system of the FIGURE which employs max-backoff values determined using a Max-ARPA table 24, and includes components 14, 20, 22 for generating the Max-ARPA table 24, is suitably embodied by a computer 40 or other electronic data processing device programmed to perform the disclosed processes, including the entries sorting performed by the entries sorter 14 and the Pass1 and Pass2 algorithms performed by the first- and second-pass modules 20, 22, respectively. The disclosed techniques may additionally or alternatively be embodied by a non-transitory storage medium storing instructions executable by the illustrative computer 40 or other electronic data processing device to perform the disclosed processes. The non-transitory storage medium may, for example, comprise a hard disk or other magnetic storage medium, an optical disk or other optical storage medium, a random access memory (RAM), read-only memory (ROM), flash memory or other electronic storage medium, various combinations thereof, or so forth.

In the following, it is demonstrated that the Pass1 and Pass2 algorithms operating on the sorted ARPA table $T_{sorted}$ produce the max-ARPA table ($T_{mA}$) 24 which when processed by the readout algorithm of Equation (3) allows computation of the max-backoff w(A,z) for any n-gram Az, both when Az is listed in the max-ARPA table ($T_{mA}$) 24 and when it is not listed. To this end, a proof by induction is presented in the following.

It is first supposed that the length of the context A is strictly larger than the order N of the language model. Then for any head h preceding Az, it follows that p(z|hA)=p(z|A); this is because hA $\notin T_{mA}$ and A $\notin T_{mA}$, along with all intermediary strings, hence, by Equation (2) it follows that p(z|hA)=p (z|tail(hA))=p (z|tail(tail(hA)))= . . . =p(z|A). Hence, w(A,z)=p(A,z) and, because Az $\notin T_{mA}$ and A $\notin T_{mA}$, the theorem is satisfied in this case.

Having established the theorem for |A|>N, it is now assumed that it is true for |A|>n and it is proved by induction that it is true for |A|=n. This proof by induction uses the fact that, by the definition of the max-backoff w, the equality w(A,z)=$\max_{x\in V}$ w(xA,z) holds.

There are three cases to consider.

First, suppose Az $\notin T_{mA}$ and A $\notin T_{mA}$. Then xAz $\notin T_{mA}$ and xA $\notin T_{mA}$ hold, and hence by induction w(xA,z)=p(xA,z)=p (A,z) for any x, therefore w(A,z)=p(A,z). Thus the first case is proven.

Second, suppose Az $\notin T_{mA}$ and A $\in T_{mA}$. Then for any x, the relation xAz $\notin T_{mA}$ holds, and $$w(A,z) = \max_{x \in V} w(xA,z) = \max\left(\max_{x \in V, xA \notin T_{mA}} w(xA,z), \max_{x \in V, xA \in T_{mA}} w(xA,z)\right) \quad (4)$$

For xA $\notin T_{mA}$ it follows by induction that w(xA,z)=p(xA,z)=p(A,z) and therefore $\max_{x \in V, xA \notin T_{mA}}$ w(xA,z)=p(A, z). For xA $\in T_{mA}$, the relation w(xA,z)=p(xA,z)×xA.m=p(A, z)×xA.b×xA.m holds. Thus, $$\max_{x \in V, xA \in T_{mA}} w(xA,z) = p(A,z) \times \max_{x \in V, xA \in T_{mA}} xA \cdot b \times xA \cdot m \quad (5)$$

But now, because of lines 3 and 4 of the Pass1 Algorithm, A.m=$\max_{x \in V, xA \in T_{mA}}$ xA.b×xA.m holds, and hence $\max_{x \in V, xA \in T_{mA}}$ w(xA,z)=p(A,z)×A.m. Therefore, w(A,z)=max (p(A,z), p(A,z)×A.m)=p(A,z)×A.m, where the fact that A.m≥1 due to line 1 of the Pass1 Algorithm is used. Thus, the second case is proven.

Third, suppose that Az $\in T_{mA}$. Then, again, $$w(A,z) = \max_{x \in V} w(xA,z) = \max\begin{pmatrix} \max_{x \in V, xAz \notin T_{mA}, xA \notin T_{mA}} w(xA,z), \\ \max_{x \in V, xAz \notin T_{mA}, xA \in T_{mA}} w(xA,z), \\ \max_{x \in V, xAz \in T_{mA}} w(xA,z) \end{pmatrix} \quad (6)$$

For xAz $\notin T_{mA}$, xA $\notin T_{mA}$, the relation w(xA,z)=p(xA,z)=p (A,z)=Az.p holds, where the last equality is due to the fact that Ax $\in T_{mA}$. For xAz $\notin T_{mA}$, xA $\in T_{mA}$, the relation w(xA,z)=p (xA,z)×xA.m=p(A,z)×xA.b×xA.m=Az.p×xA.b×xA.m holds. For xAz $\in T_{mA}$, the relation w(xA,z)=xAz.w holds. Overall, the result is:

$$w(A,z) = \max\begin{pmatrix} Az \cdot p, \\ \max_{x \in V, xAz \notin T_{mA}, xA \in T_{mA}} Az \cdot p \times xA \cdot b \times xA \cdot m, \\ \max_{x \in V, xAz \in T_{mA}} xAz \cdot w \end{pmatrix} \quad (7)$$

Note that xAz $\in T_{mA} \Rightarrow$ xA $\in T_{mA}$, and from this it can be seen that the Pass2 Algorithm exactly computes Az.w as this maximum over three maxima, and hence Az.w=w(A,z). Thus, the second case is proven.

The three cases having been established, the proof by induction of the theorem is complete.

Depending on certain smoothing and implementation options, it may be that the ARPA table 10 built to represent a certain language model satisfies the condition that A.b is always smaller than 1. In such situations, it can be seen that the .m values computed in the Pass1 Algorithm always are equal to 1; there is therefore no need for a fourth column, or for Pass1, and the last clause of the Pass2 Algorithm can be simplified; also, the first two cases of Equation (3) collapse to a single case. The disclosed construction of the max-ARPA table 24 contains this particular case, but also accounts for the general situation where some .b values be higher than 1.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A non-transitory storage medium storing instructions readable and executable by an electronic data processing device to perform a method operating on an ARPA table for a modeled natural language in which each entry of the ARPA table includes an n-gram Az, an associated backoff value Az.p equal to the conditional probability p(z|A) that symbol z follows context A in the modeled natural language, and an associated backoff weight value Az.b for the context A, the method comprising:

computing by said electronic data processing device a max-ARPA table from the ARPA table by operations including:
  computing and adding for each entry of the ARPA table an associated maximum backoff weight product value Az.m wherein the computing and adding of the associated maximum backoff weight product values is performed on the entries of the ARPA table in descending n-gram order; and
  after computing and adding the associated maximum backoff weight product values, computing and adding for each entry of the ARPA table an associated max-backoff value Az.w=w(A,z) where w(A,z)=$\max_h$ p(z|hA) is the maximum backoff value for any head h preceding the context A of the n-gram Az and the computing and adding of the associated max-backoff values is performed on the entries of the ARPA table in descending n-gram order;

wherein each entry of the max-ARPA table includes an n-gram Az and its associated backoff value Az.p, backoff weight value Az.b, maximum backoff weight product value Az.m, and max-backoff value Az.w: and
  computing by said electronic data processing device a max-backoff value w(A,z) for an n-gram Az of the modeled natural language that is not in the ARPA table by applying the recursive equation:

$$w(A, z) = \begin{cases} p(A, z) & \text{if } Az \notin T_{mA} \text{ and } A \notin T_{mA} \\ p(A, z) \times A \cdot m & \text{if } Az \notin T_{mA} \text{ and } A \in T_{mA} \\ Az \cdot w & \text{if } Az \in T_{mA} \end{cases}$$

where the values A.m and Az.w are obtained from the .m and .w columns of the max-ARPA table $T_{mA}$, respectively, and p(A,z) is computed from the .p and .b columns of the max-ARPA table.

2. The non-transitory storage medium as set forth in claim 1 wherein:
   the computing of the max-ARPA table includes the further operation of sorting the entries of the ARPA table in descending n-gram order prior to computing and adding the maximum backoff weight product values Az.m;
   the computing and adding of the associated maximum backoff weight product values Az.m is performed from top-to-bottom on the sorted ARPA table whereby the computing and adding of the associated maximum backoff weight product values is performed on the entries of the ARPA table in descending n-gram order; and
   the computing and adding of the associated max-backoff values Az.w is performed from top-to-bottom on the sorted ARPA table whereby the computing and adding of the associated max-backoff values is performed on the entries of the ARPA table in descending n-gram order.

3. The non-transitory storage medium as set forth in claim 2 wherein the operation of computing and adding for each entry of the sorted ARPA table an associated maximum backoff weight product value A.m comprises performing the algorithm:

```
For A in T_sorted
    A.m ← 1
    For x in V s.t.xA in T_sorted:
        A.m ← max(A.m, xA.b × xA.m)
``` where $T_{sorted}$ is the sorted ARPA table, the algorithm is performed from top-to-bottom of the sorted ARPA table $T_{sorted}$, and V is the vocabulary of the modeled natural language, and the maximum backoff weight product value for entry A is the value A.m computed by performing the algorithm.

4. The non-transitory storage medium as set forth in claim 3 wherein the operation of computing and adding for each entry Az of the sorted ARPA table an associated max-backoff value Az.w comprises performing the algorithm:

```
For Az in T_sorted
    Az.w ← Az.p
    For x in V s.t.xA in T_sorted:
        If xAz in T_sorted:
            Az.w ← max(Az.w,xAz.w)
        Else
            Az.w ← max(Az.w,Az.p × xA.b × xA.m)
``` from top-to-bottom of the sorted ARPA table.

5. The non-transitory storage medium as set forth in claim 1 wherein the method further comprises:
   computing the backoff value p(z|A) for an n-gram Az of the natural language that is not in the ARPA table by applying the recursive equation:

$$p(A, z) = \begin{cases} p(\text{tail}(A), z) & \text{if } Az \notin T_{mA} \text{ and } A \notin T_{mA} \\ p(\text{tail}(A), z) \times A \cdot b & \text{if } Az \notin T_{mA} \text{ and } A \in T_{mA} \\ Az \cdot p & \text{if } Az \in T_{mA} \end{cases}$$

where tail(A) denotes the string A with its first element removed and the values A.b and Az.p are obtained from the .b and .p columns of the max-ARPA table, respectively.

6. The non-transitory storage medium of claim 1 wherein the method further comprises:
   sampling a language model of the natural language represented by the ARPA table by generating an upper bound on the language model and then sequentially refining the upper bound during the sampling process using max-backoff values w(A,z) computed using the operation (4).

7. The non-transitory storage medium of claim 6 wherein the method further comprises:
   performing statistical machine translation using the sampling of the natural language.

8. The non-transitory storage medium of claim 6 wherein the method further comprises:
   performing part-of-speech tagging using the sampling of the natural language.

9. A method operating on an ARPA table for a modeled natural language in which each entry of the ARPA table includes an n-gram Az, an associated backoff value Az.p equal to the conditional probability p(z|A) that symbol z follows context A in the modeled natural language, and an associated backoff weight value Az.b for the context A, the method comprising:
   computing a max-ARPA table from the ARPA table by using an electronic data processing device to perform the operations of:
      sorting the entries of the ARPA table in descending n-gram order to generate a sorted ARPA table;
      (1) after the sorting, computing and adding for each entry from top-to-bottom of the sorted ARPA table an associated maximum backoff weight product value Az.m; and
      (2) after performing operation (1), computing and adding for each entry from top-to-bottom of the sorted ARPA table an associated max-backoff value Az.w where Az.w=$\max_h$ p(z|hA) is the maximum backoff value for any head h preceding the context A of the n-gram Az;
   wherein each entry of the max-ARPA table includes an n-gram Az and its associated backoff value Az.p, backoff weight value Az.b, maximum backoff weight product value Az.m, and max-backoff value Az.w;
   computing by said electronic data processing device a max-backoff value w(A,z) for an n-gram Az that is not in the ARPA table by applying the recursive equation:

$$w(A, z) = \begin{cases} p(A, z) & \text{if } Az \notin T_{mA} \text{ and } A \notin T_{mA} \\ p(A, z) \times A \cdot m & \text{if } Az \notin T_{mA} \text{ and } A \in T_{mA} \\ Az \cdot w & \text{if } Az \in T_{mA} \end{cases}$$

where the values A.m and Az.w are obtained from the .m and .w columns of the max-ARPA table $T_{mA}$, respectively, and p(A,z) is computed from the .p and .b columns of the max-ARPA table, and the computing of the max-backoff value w(A,z) is performed by the electronic data processing device; and sampling a language model of the natural language represented by the ARPA table by generating an upper bound on the language model and then sequentially refining the upper bound during the sampling process using the computed max-backoff value w(A,z) wherein the generating and sequential refining are performed by the electronic data processing device.

10. The method of claim 9 wherein performing operation (1) comprises performing the algorithm:

```
For A in T_sorted
    A.m ← 1
    For x in V s.t. xA in T_sorted:
        A.m ← max(A.m, xA.b × xA.m)
``` where $T_{sorted}$ is the sorted ARPA table, the algorithm is performed from top-to-bottom of the sorted ARPA table $T_{sorted}$, and V is the vocabulary of the modeled natural language, and the maximum backoff weight product value for entry A is assigned the value A.m computed by performing the algorithm.

11. The method of claim 10 wherein performing operation (2) comprises performing the algorithm:

```
For Az in T_sorted
    Az.w ← Az.p
    For x in V s.t. xA in T_sorted:
        If xAz in T_sorted:
            Az.w ← max(Az.w, xAz.w)
        Else
            Az.w ← max(Az.w, Az.p × xA.b × xA.m)
``` from top-to-bottom of the sorted ARPA table $T_{sorted}$.

12. The method claim 9 further comprising:
computing the backoff value p(z|A) for an n-gram Az that is not in the ARPA table by applying the recursive equation:

$$p(A, z) = \begin{cases} p(\text{tail}(A), z) & \text{if } Az \notin T_{mA} \text{ and } A \notin T_{mA} \\ p(\text{tail}(A), z) \times A \cdot b & \text{if } Az \notin T_{mA} \text{ and } A \in T_{mA} \\ Az \cdot p & \text{if } Az \in T_{mA} \end{cases}$$

where tail(A) denotes the string A with its first element removed and the values A.b and Az.p are obtained from the .b and .p columns of the max-ARPA table, respectively, and wherein the computing of the backoff value p(z|A) is performed by the electronic data processing device.

13. The method of claim 9 further comprising:
performing statistical machine translation or part-of-speech tagging using the sampling of the natural language.

14. An apparatus comprising:
a computer programmed to perform a method operating on an ARPA table for a modeled natural language in which each entry of the ARPA table includes an n-gram Az, an associated backoff value Az.p equal to the conditional probability p(z|A) that symbol z follows context A in the modeled natural language, and an associated backoff weight value Az.b for the context A, the method comprising:
(1) computing and adding by said computer for each entry of the ARPA table in descending n-gram order an associated maximum backoff weight product value Az.m;

(2) after performing operation (1), computing and adding by said computer for each entry of the ARPA table in descending n-gram order an associated max-backoff value Az.w=max$_h$p(z|hA) which is the maximum backoff value for any head h preceding the context A of the n-gram Az; and
(3) extending by said computer the ARPA table by adding a column storing the associated maximum backoff weight product values Az.m and a column storing the associated max-backoff values Az.w.

15. The apparatus of claim 14 wherein the method further comprises:
(0) sorting the entries of the ARPA table in descending n-gram order to generate a sorted ARPA table;
wherein each of operation (1) and operation (2) is performed on the sorted ARPA table from top-to-bottom.

16. The apparatus of claim 15 wherein operation (1) comprises performing the algorithm:

```
For A in T_sorted
    A.m ← 1
    For x in V s.t. xA in T_sorted:
        A.m ← max(A.m, xA.b × xA.m)
``` wherein the algorithm is performed from top-to-bottom on the sorted ARPA table $T_{sorted}$, V is the vocabulary of the modeled natural language, and the maximum backoff weight product value for entry Az is assigned the value Az.m computed by performing the algorithm.

17. The apparatus of claim 16 wherein operation (2) comprises performing the algorithm:

```
For Az in T_sorted
    Az.w ← Az.p
    For x in V s.t. xA in T_sorted:
        If xAz in T_sorted:
            Az.w ← max(Az.w, xAz.w)
        Else
            Az.w ← max(Az.w, Az.p × xA.b × xA.m)
``` from top-to-bottom on the sorted ARPA table $T_{sorted}$.

18. The apparatus of claim 14 wherein the method performed by the computer further comprises:
(4) computing a max-backoff value w(A,z) for an n-gram Az that is not in the ARPA table by applying the recursive equation:

$$w(A, z) = \begin{cases} p(A, z) \times A \cdot m & \text{if } Az \notin T \\ Az \cdot w & \text{if } Az \in T \end{cases}$$

where T denotes the extended ARPA table, Az.w is obtained from the Az.w column added to the ARPA table, A.m is obtained from the .m column added to the ARPA table if listed and is assigned a default value otherwise, and p(A,z) is computed from the .p and .b columns of the ARPA table.

19. The apparatus of claim 18 wherein the method performed by the computer further comprises:
sampling a language model of the natural language represented by the ARPA table by generating an upper bound on the language model and then sequentially refining the upper bound during the sampling process using max-backoff values w(A,z) computed using the operation (4).

20. The apparatus of claim 19 wherein the method performed by the computer further comprises:
  performing statistical machine translation or part-of-speech tagging using the sampling of the natural language.

* * * * *